(12) United States Patent
Pellenc et al.

(10) Patent No.: US 10,091,952 B2
(45) Date of Patent: Oct. 9, 2018

(54) METHOD FOR CONTROLLING THE PLANTING OF OLIVE TREES FOR THE CONTINUOUS MECHANICAL HARVESTING OF THE OLIVES

(71) Applicant: PELLENC (Société Anonyme), Pertuis (FR)

(72) Inventors: Roger Pellenc, Pertuis (FR); Christian Rolland, Cucuron (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 269 days.

(21) Appl. No.: 14/351,094

(22) PCT Filed: Dec. 13, 2012

(86) PCT No.: PCT/FR2012/000518
§ 371 (c)(1),
(2) Date: Aug. 25, 2014

(87) PCT Pub. No.: WO2013/093232
PCT Pub. Date: Jun. 27, 2013

(65) Prior Publication Data
US 2014/0360096 A1    Dec. 11, 2014

(30) Foreign Application Priority Data
Dec. 23, 2011  (FR) .................................... 11 04095

(51) Int. Cl.
*A01G 17/00* (2006.01)
*A01G 17/14* (2006.01)
*A01D 46/28* (2006.01)

(52) U.S. Cl.
CPC ........... *A01G 17/005* (2013.01); *A01G 17/14* (2013.01); *A01D 46/28* (2013.01)

(58) Field of Classification Search
CPC ...... A01G 17/00; A01G 17/005; A01G 17/04; A01G 17/06; A01G 2017/065; A01G 17/02; A01D 46/00; A01D 46/26; A01D 46/28
(Continued)

(56) References Cited

U.S. PATENT DOCUMENTS 1,594,195 A * 7/1926 Henderson ............... A01G 9/12
    24/546
1,875,561 A * 9/1932 Cirrito .................. A01G 17/005
    47/58.1 R
(Continued)

FOREIGN PATENT DOCUMENTS

EP    2047740 A1 *  4/2009  ........... A01G 3/0408
EP    2196080 A1 *  6/2010  ............. A01D 46/28
(Continued)

*Primary Examiner* — Tien Q Dinh
*Assistant Examiner* — Morgan T Barlow
(74) *Attorney, Agent, or Firm* — Egbert Law Offices, PLLC

(57) ABSTRACT

A method for controlling the planting of olive trees for the continuous mechanical harvesting of the olives using harvesting machines, the method having the following steps: planting parallel rows of olive tree saplings with a spacing between the tree trunks and a spacing between the rows; placing trellising on each row; placing divergent supports for each tree; attaching two divergent branches of each tree, which are arranged in a single vertical plane and in the vertical plane of the row to which said tree belongs, onto a pair of supports; removing other branches of said tree; adapting the shape of the foliage of the trees so as to impart a configuration flattened in alignment with the rows thereto; maintaining said configuration by periodically pruning the trees until the latter reach maturity and bear fruit; and removing the supports and the trellising when the trees are fully grown.

9 Claims, 5 Drawing Sheets

(58) Field of Classification Search
USPC ....... 47/1.01 R, 46, 58.1 R, 58.1 SE, 42, 44, 47/47, 43, 7; 56/328.1, 340.1, 330
See application file for complete search history.

(56) References Cited

U.S. PATENT DOCUMENTS

| | | | | | |
|---|---|---|---|---|---|
| 2,788,615 | A | * | 4/1957 | Hauser | A01G 17/06 47/47 |
| 3,585,756 | A | * | 6/1971 | Johnson | A01G 17/06 47/46 |
| 3,807,089 | A | * | 4/1974 | Senese | A01G 17/06 248/219.2 |
| 4,291,526 | A | * | 9/1981 | Hiyama | A01D 46/28 56/330 |
| 4,318,246 | A | * | 3/1982 | Jungbluth | A01G 17/12 47/42 |
| 4,625,454 | A | * | 12/1986 | Daniell | A01G 17/06 47/44 |
| 4,738,051 | A | * | 4/1988 | Dyson | A01G 17/06 47/46 |
| 4,881,342 | A | * | 11/1989 | Ferguson | A01G 9/128 248/125.1 |
| 4,959,950 | A | * | 10/1990 | Burke | A01D 46/28 56/330 |
| 4,993,184 | A | * | 2/1991 | Howe | A01G 9/12 47/4 |
| 5,272,834 | A | * | 12/1993 | Jarahian | A01G 17/06 211/119.01 |
| 5,333,828 | A | * | 8/1994 | Severeid | A47G 33/12 248/167 |
| 5,373,660 | A | * | 12/1994 | Stiles | A01G 17/06 47/46 |
| 5,411,561 | A | * | 5/1995 | Conley | A01G 17/06 47/44 |
| 5,557,883 | A | * | 9/1996 | Walker | A01G 17/06 47/46 |
| 5,638,636 | A | * | 6/1997 | Hiyama | A01G 17/06 47/44 |
| 5,787,548 | A | * | 8/1998 | Tzen | A01G 17/10 16/82 |
| 6,003,294 | A | * | 12/1999 | Fitzgerald | A01D 46/28 56/330 |
| 6,021,601 | A | * | 2/2000 | Weathers | A01G 17/10 248/499 |
| 6,155,036 | A | * | 12/2000 | Pellenc | A01D 46/28 56/328.1 |
| 6,209,258 | B1 | * | 4/2001 | Schneider | A01G 9/124 47/46 |
| 6,311,428 | B1 | * | 11/2001 | Marino | A01G 9/12 256/65.05 |
| 6,374,538 | B1 | * | 4/2002 | Morris | A01G 9/143 198/817 |
| 6,378,245 | B1 | * | 4/2002 | Summers | A01G 17/06 47/45 |
| 6,449,898 | B1 | * | 9/2002 | Alban | A01G 17/00 47/58.1 FV |
| 6,487,816 | B1 | * | 12/2002 | Wolter | A01G 9/12 47/45 |
| 6,631,584 | B1 | * | 10/2003 | Seinsevin | A01G 13/043 47/20.1 |
| 6,857,619 | B1 | * | 2/2005 | Jangula | E02F 3/96 254/132 |
| 7,219,467 | B1 | * | 5/2007 | Branman | A01G 9/12 47/45 |
| 7,652,766 | B2 | * | 1/2010 | Pellenc | A01B 69/001 356/432 |
| 7,661,224 | B1 | * | 2/2010 | Poyas | A01G 9/12 248/218.4 |
| 7,818,915 | B1 | * | 10/2010 | Flaishman | A01G 17/00 47/1.43 |
| 7,818,953 | B2 | * | 10/2010 | Pellenc | A01D 46/28 56/10.2 R |
| 7,841,160 | B2 | * | 11/2010 | Pellenc | A01D 46/28 56/328.1 |
| 7,870,712 | B2 | * | 1/2011 | Pellenc | A01G 3/0408 56/233 |
| 8,069,641 | B2 | * | 12/2011 | Pellenc | A01D 46/28 56/328.1 |
| 8,136,291 | B2 | * | 3/2012 | Morgan | A01G 9/12 47/47 |
| 8,136,293 | B2 | * | 3/2012 | Morgan | A01G 9/122 47/47 |
| 8,479,442 | B2 | * | 7/2013 | Wielgosch | A01G 9/12 47/4 |
| 8,511,051 | B2 | * | 8/2013 | Pellenc | A01D 46/28 56/330 |
| 2002/0011023 | A1 | * | 1/2002 | Ambrose | A01G 17/04 47/42 |
| 2003/0177694 | A1 | * | 9/2003 | Sellers | A01G 17/10 47/42 |
| 2003/0205647 | A1 | * | 11/2003 | Boucher | A01G 9/122 248/156 |
| 2004/0107686 | A1 | * | 6/2004 | Isern | A01G 17/00 56/327.1 |
| 2004/0244286 | A1 | * | 12/2004 | Sedlacek | A01G 9/12 47/47 |
| 2007/0062109 | A1 | * | 3/2007 | Jolley | A01G 17/14 47/47 |
| 2007/0289210 | A1 | * | 12/2007 | Gray | A01G 9/12 47/47 |
| 2008/0016838 | A1 | * | 1/2008 | Pellenc | A01D 46/26 56/340.1 |
| 2008/0092439 | A1 | * | 4/2008 | Banks | A01G 17/14 47/47 |
| 2008/0190019 | A1 | * | 8/2008 | Hart | A01G 9/12 47/47 |
| 2009/0119984 | A1 | * | 5/2009 | Nabhan | A01G 17/04 47/43 |
| 2009/0133326 | A1 | * | 5/2009 | Donaldson | A01G 9/02 47/47 |
| 2009/0293353 | A1 | * | 12/2009 | Arief | A01G 17/06 47/47 |
| 2010/0018114 | A1 | * | 1/2010 | Yang | A01G 9/124 47/47 |
| 2011/0067298 | A1 | * | 3/2011 | Balbas Arroyo | A01G 13/0206 47/22.1 |
| 2011/0154731 | A1 | * | 6/2011 | Schaeffer | A01G 17/06 47/45 |
| 2011/0277382 | A1 | * | 11/2011 | Davis | A01G 9/12 47/70 |
| 2012/0011769 | A1 | * | 1/2012 | Decker | A01G 17/06 47/43 |
| 2012/0102832 | A1 | * | 5/2012 | Baron | A01G 17/005 47/66.7 |
| 2012/0291345 | A1 | * | 11/2012 | Sazhanov | A01G 17/06 47/45 |

FOREIGN PATENT DOCUMENTS

| | | | | |
|---|---|---|---|---|
| FR | 2552622 A3 | * | 4/1985 | ............ A01G 17/02 |
| FR | 2935128 A1 | * | 2/2010 | ............ A01D 46/28 |
| GB | 2220118 A | * | 1/1990 | ............ A01G 9/124 |
| GB | 2281493 A | * | 3/1995 | ............ A01D 46/28 |
| JP | 06165623 A | * | 6/1994 | |

* cited by examiner

METHOD FOR CONTROLLING THE PLANTING OF OLIVE TREES FOR THE CONTINUOUS MECHANICAL HARVESTING OF THE OLIVES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns the domain of oil-bearing plants.

It is connected to a method for controlling the planting of olive trees adapted to the mechanical harvesting of olives. Its aim is more specifically to create, in the regions of controlled designation of origin [AOC], olive plantings of varieties benefiting of such designations, adapted to the continuous mechanical harvesting of olives, using self-propelled or tractor-drawn, straddling harvesting machinery.

The form of control of the plantings according to the invention ensures in particular, over a large number of years, very significant crop yields at reduced investment costs.

2. Description of Related Art Including Information Disclosed Under 37 CFR 1.97 and 37 CFR 1.98

It is estimated that the domestication of olive trees goes back about six thousand years and that the extraction of olive oil is said to be even more ancient.

In the beginning and for thousands of years, olives have been picked by hand or were detached from the trees by beating the latter with long, thin sticks, the olives thus detached from the trees and lying on the ground being then picked up manually, or, more recently, collected on nets or tarps spread out under the trees. This ancestral method produces, of course, a very low yield.

This type of gathering was somewhat improved by the use of combs, either hand-held or attached to the end of a thin pole.

Some of these combs or rakes have been combined with a bag thus enabling a certain quantity of fruit to be collected while avoiding having to pick them up on the ground.

It is only just before the middle of the last century that portable mechanical tools, as aids for the harvesting, as well as mobile machines for its mechanization came on the market.

In the domain of devices, we are familiar, for example, with portable harvesting tools which comprise a vibrating comb or rake mounted at the distal end of a thin pole that may be telescopic or not and which is driven by a motor.

According to a variant manufacture of such portable air tools, the vibrating comb is replaced by a vibrating clamp or a vibrating hook that attaches itself to the tree limbs to be shaken.

It has been established that these motorized, portable harvesting tools are three to four times more effective, compared to just beating the branches, but this yield remains still quite insignificant, while this harvesting method is very tiring for the operators and remains therefore reserved for very small operations or even individual persons.

In the area of machinery, more productive equipment has appeared in the last thirty years. This includes trunk shakers consisting of a motorized, vibrating clamp intended to be placed around the trunk or large tree limbs. These vibrators can be attached to the front of a self-propelled vehicle or they may be produced in the form of a self-propelled machine. The yield of such machinery is significantly higher than that obtained by motorized portable tools. However, the harvesting operation remains relatively slow. As a matter of fact, the vibrator needs to be stopped in front of each tree, the vibrating clamp must be positioned around the trunk and/or its major limbs, the vibrations need to be set and applied in order to cause the olives to drop, then the clamp needs to be removed and the vibrator is to be moved to the next tree. Then the olives need to be picked up from a net or tarp spread out around the tree and under its foliage. These trunk vibrators do not allow for continuous harvesting of the olives. They always require a great deal of labor. These machines need to be maneuvered to each tree, making the operation delicate when the trees stand close together. They do not permit harvesting at night because that would be too dangerous.

In order to remedy these insufficiencies that for over ten years straddling harvesters derived from grape picking machines have been proposed, these machines having the primary advantage of operating continuously and directly collecting the olives detached from the trees, while avoiding having to pick them up from the ground or having to spread collecting nets or tarps. They are capable of working around the clock. They make it possible to shorten the harvesting duration which is a sign of quality.

The straddling harvesters that are usable for harvesting olives could be of the type that feature, on the one hand, a harvesting head comprising a shaking system consisting of two fruit-detaching assemblies mounted facing each other and separated by a vertical space or passage and, on the other hand, a receiving and conveying system for the fruit detached from the trees, comprising a collecting plane or articulated traversable floor consisting of inclined and pivoting plates or scales and two driving devices for the raw gathered crop dumped on the articulated flooring, the drives being positions on either side of the latter, towards a conveying system transporting the crop to a storage bin.

Until now the mode of managing olive groves is the result of various considerations (local usage, climatic environment, ground configurations, variety of olive trees, regulations concerning the varieties intended for the production of olive oil, . . . ) excluding practically the adaptation of this management to the harvesting instruments, devices or machines used.

The various forms of operations presently used with single-trunk trees can be grouped into:
goblet shapes (polygonal goblet, upside down, bushy), (between 300 and 500 trees per hectare);
globe-shaped (between 300 and 500 trees per hectare);

vertical axis shapes (single-cone, vertical axis), (between 300 and 500 trees per hectare);

interlocking shapes (espaliers, rows): intensive (up to 800 trees per hectare), or super-intensive (over 800 trees per hectare).

Certain ones of these forms of plantings do not permit to harvest olives by machines derived from harvesting machines, whereas others are poorly adapted to this type of harvesting considered to be a promise of a bright future.

In particular, the present forms of olive grove management are not adapted to the special rules concerning the management of groves with varieties that are recognized for the production of olive oil with controlled designation of origin.

One objective of the invention is therefore to provide a system of managing olive groves adapted to all olive varieties in the world, in particular to the types recognized for the production of olive oil with controlled designation of origin, permitting the continuous harvesting of olives, with high yields through the entire life of the trees (several decades). In the case of a grove constituted by trees spaced every 4 m on the planting line with a row spacing of 6 m and equipped with a fertilizing drip irrigation system, yields in the range of 18 to 20 tons per hectare can be reasonably expected.

BRIEF SUMMARY OF THE INVENTION

This objective has been achieved thanks to a method of olive grove management that is adapted to the continuous, mechanical harvesting of olives that is characterized by the following steps:

Planting of parallel rows of young olive trees with spacing between the tree trunks and spacing between the rows;

Installing, on each row of trees, a collective vertical espalier consisting of spaced posts that may be linked by horizontal espalier wiring (metal or plastic wire, . . . );

Placing divergent stakes on this espalier, for each tree;

Attaching two divergent limbs of each tree, positioned in the same vertical plane and in the vertical plane of the row to which said tree belongs, to a pair of divergent stakes;

Eliminating the other limbs of said tree;

Adaptation of the shape of the foliage or overhead fruit-bearing part of the trees to give them a 'flattened' configuration oriented in the alignment of the rows;

Maintaining this configuration through periodic (annual or bi-annual) pruning until the trees have reached maturity and are producing fruit, in order to permit continuous harvest of the olives by means of straddling harvesting machines.

Removing the stakes and espalier wires when the trees have reached maturity.

According to another characteristic disposition, the two main limbs that have been kept on each tree for the implementation of this management system of olive tree cultivation comprise a first major limb growing vertically or in a direction close to vertical in the extension of the tree trunk and a second major limb oriented obliquely relative to said first major limb by forming a V with the latter.

Advantageously, the two major limbs are attached to the stakes so as to form between them an angle between 30° and 90° and preferentially an angle of 45°. This angle must be sufficiently large to provide a significant vegetative surface, but sufficiently small to support the weight of the load of fruit generated by this vegetative surface.

According to another characteristic disposition, the first and second diverging limbs of the trees forming a row are disposed successively in identical manner from one end of the row to the other.

According to an interesting implementation, the first and second diverging limbs of the trees forming a row have an opposite orientation to that of the first and second diverging limbs of the adjacent row(s).

According to another characteristic disposition, one retains, for constituting the second major limb, a branch beginning at a distance above the ground and more precisely at a level higher than the receiving floor of the straddling harvesting machine.

According to another characteristic disposition, an annual or bi-annual pruning of the trees is carried out so that the kept branches remain in the espaliering plane and that the foliage area constituted by the tree rows does not exceed a width of 2 m.

Preferably, the trees are planted with spacing in the range of 3 m to 8 m within the row.

According to another characteristic disposition, the planting of one row is formed by pairs of successive trees planted with a space between two trees of one pair in the range of 1.5 m to 3 m and a space between two pairs of trees in the range of 3 m to 7 m, without thereby negatively affecting the specific rules of AOC (controlled designation of origin). The advantages of this particular disposition result in better maintenance of the vegetative part of the pair of trees and also in better controlled growth of the tree pair, depending on the variety used.

Also preferably, the rows of olive trees are created with a space between rows in the range of 5 m to 8 m.

The advantages obtained by this method of planting management according to the invention are in particular a much faster harvest with a continuously working harvesting machine, the plantings and the trees being adapted to such machines, yields equivalent to those of plantings that are super-intensive and sustainable for several decades, planting and pruning costs reduced to between 2 and 4 times less than a super-intensive planting, an oil quality that will improve as the trees age, the compliance with planting criteria for varieties recognized for the production of oil with the controlled designation of origin, and an adaptation to all olive varieties world-wide.

BRIEF DESCRIPTION OF THE DRAWINGS

The afore-mentioned aims, characteristics and advantages, and still more, will become clearer in the description below and the attached drawings in which.

Reference to these drawings is made to describe an interesting, although by no means limiting example of the method of planting olive trees that is adapted to the continuous mechanical harvesting of olives according to the invention.

DETAILED DESCRIPTION OF THE INVENTION

In the exposé below:
- the term "young olive trees" designates trees of an age generally between 5 years and 10 years depending on the species, regions, countries, these young olive trees featuring developing structures endowed with suppleness giving them flexibility and their bark is generally of clear color;
- the term "mature olive trees" designates trees that have reached their mature age. These trees being of an age which may be 10 years and above, depending on the species, regions, countries and these mature olive trees feature rigid structures the bark of which darkens more and more with age;
- the term "structural limbs" or "main limbs" designates a main limb, of a sturdy diameter, which constitutes, together with the trunk, the skeleton of the tree and on which will grow the fruit-bearing branches.

According to the method of the invention, the management of olive tree plantings is achieved by the implementation of the following steps:
- plantings of parallel rows R1, R2, R3 of young olive trees (Jo) with a spacing between the tree trunks and a spacing between the rows; advantageously, these young olive trees may be constituted by trees producing olives benefitting from the controlled designation of origin such as, for example, "Picholine du Gard", "Salonenque", "Beruguette", "Grossane", "Lucques";
- installation, on each row of trees, of a collective vertical espalier constituted by spaced posts P and which may be connected by horizontal espalier wires F (metal wire, plastic wire, . . . );
- installation of divergent stakes T1, T2 on this espalier P-F for each tree;
- attaching two divergent main limbs still undergoing growth CH1, CH2, positioned in one vertical plane and in the vertical plane of the row to which said tree belongs, to a couple of divergent stakes T1, T2, by means of any suitable fastening system;
- removal of all other major limbs of said tree, if there are any;
- adaptation of the form of foliage or overhead fruit-bearing AF of the trees so as to give them a "flattened" configuration oriented in the alignment of the rows, of a length in the order of 3 m (L0);
- maintaining this configuration through periodic (annual or bi-annual) pruning in order to permit continuous harvest of the olives by means of straddling harvesting machines;
- removal of the stakes T1, T2 and the espalier elements (posts P, wires F) when the trees have matured and the tree structures fulfill their functions of branch support.

Figure 1:
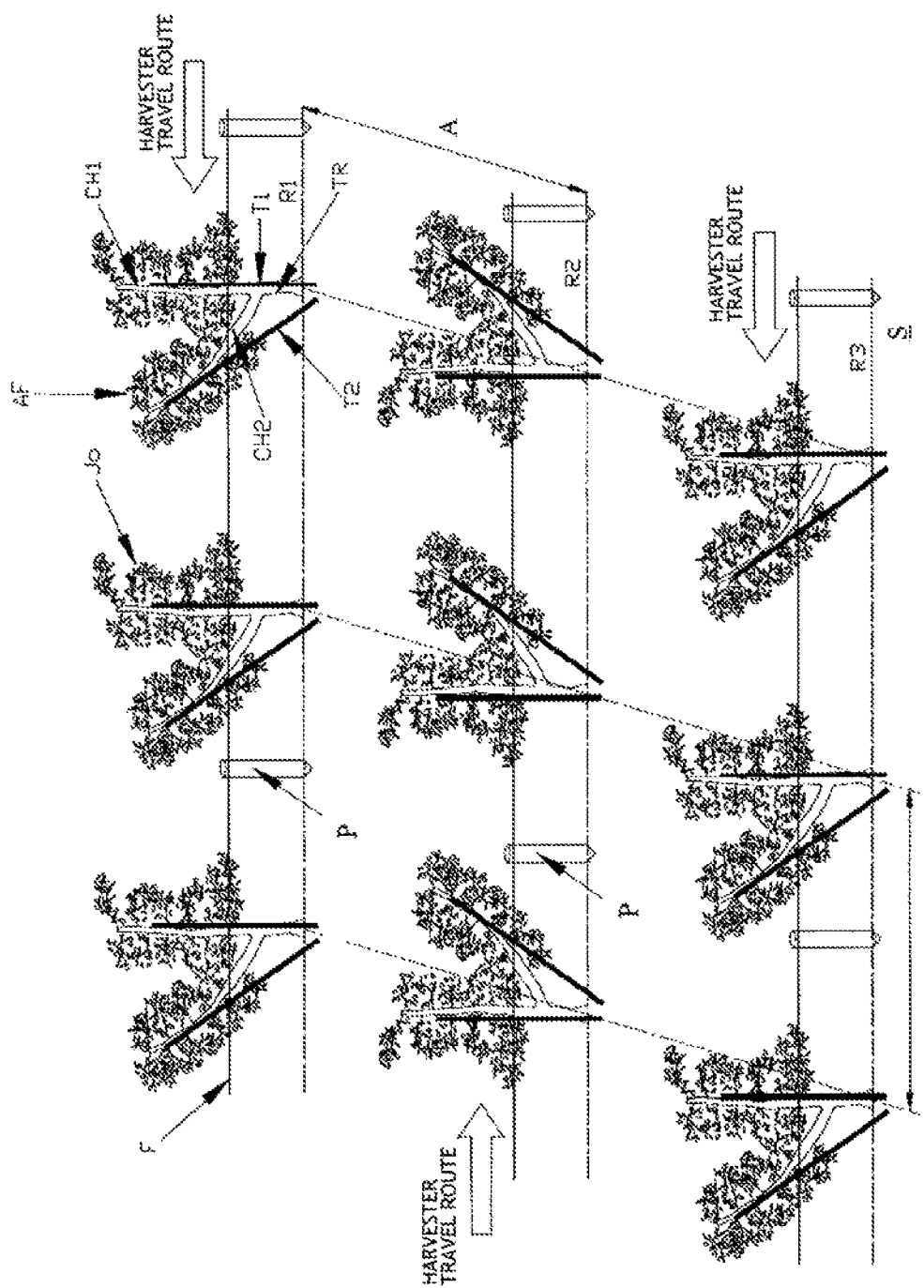
FIG. 1 is a view illustrating a plot of olive tree planting managed according to the method of the invention.
Figure 2:
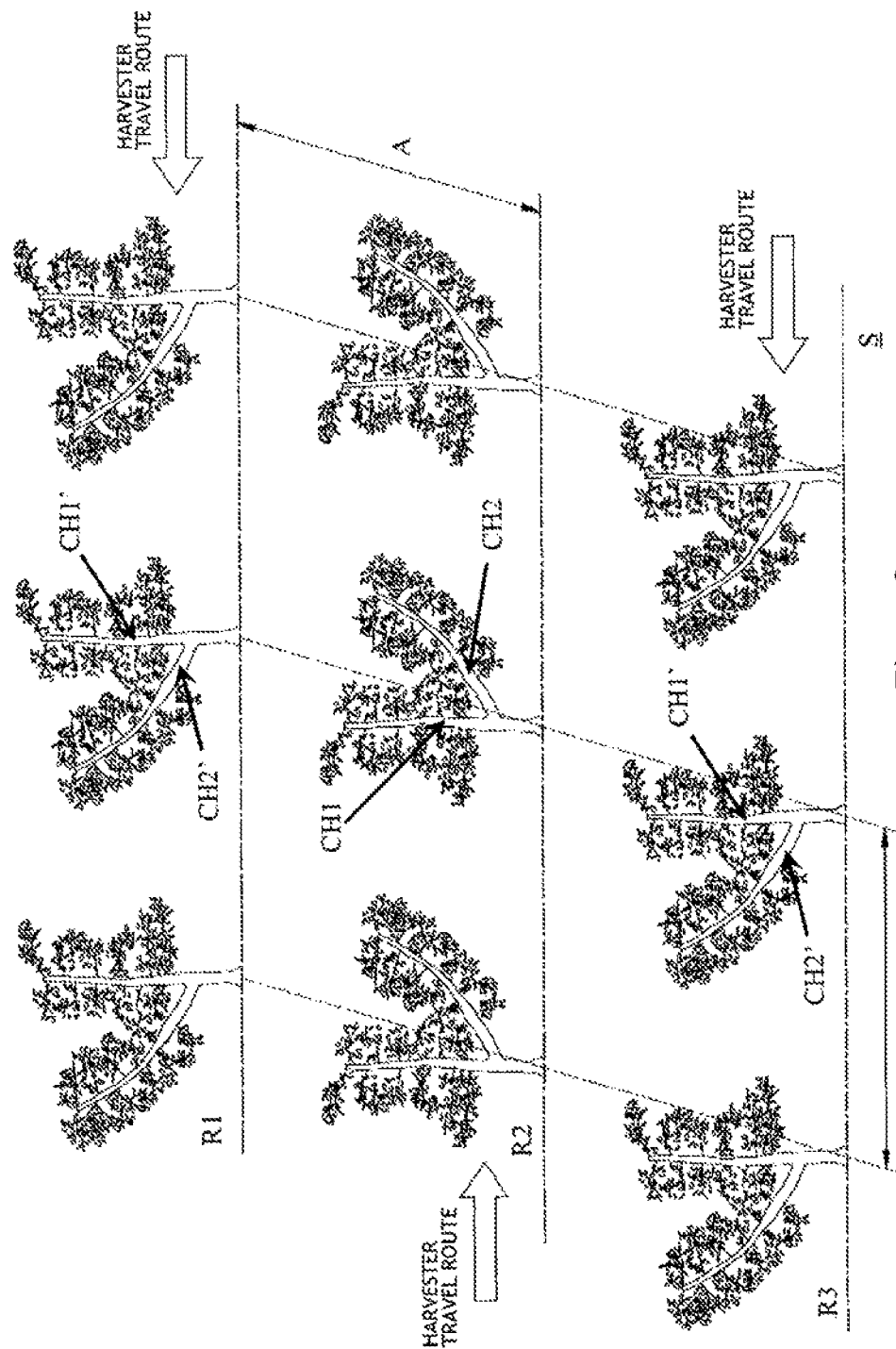
FIG. 2 is a view analog to FIG. 1, showing the planting after removal of the stakes and espaliers.

The young olive trees of each row R1, R2, R3 are planted with a spacing (B) between the trees of between 3 m and 8 m (FIG. 1).

Figure 5:
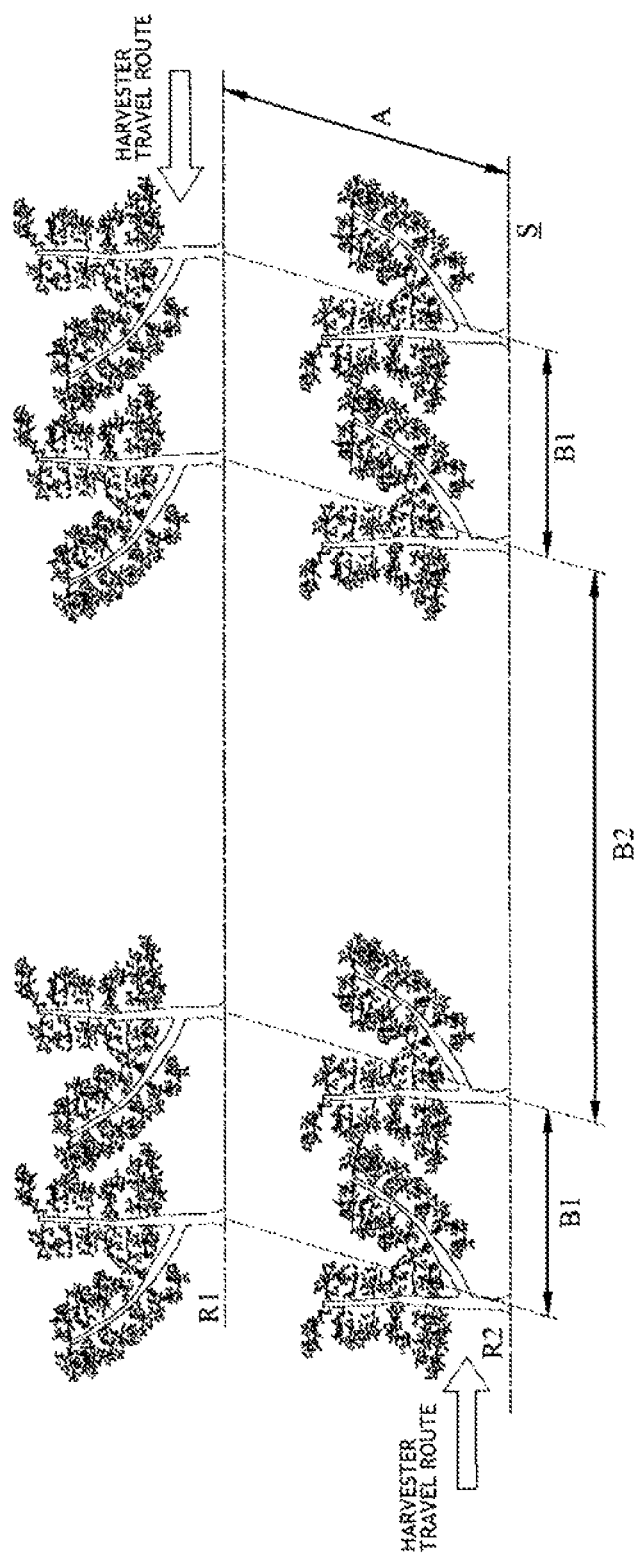
FIG. 5 is a view analog to FIG. 2 and shows a planting of olive trees in pairs of trees.

In the case of planting trees in pairs, the young olive trees of each row R1, R2, R3, are planted with a spacing in the range of 1.5 m to 3 m (B1) between the trees of the pair, each with a spacing of between 3 m and 7 m (B2) between two pairs of trees (FIG. 5).

On the other hand, the rows of olive trees are planted with a spacing (A) between rows of between 5 m and 8 m (FIG. 1).

Figure 4:
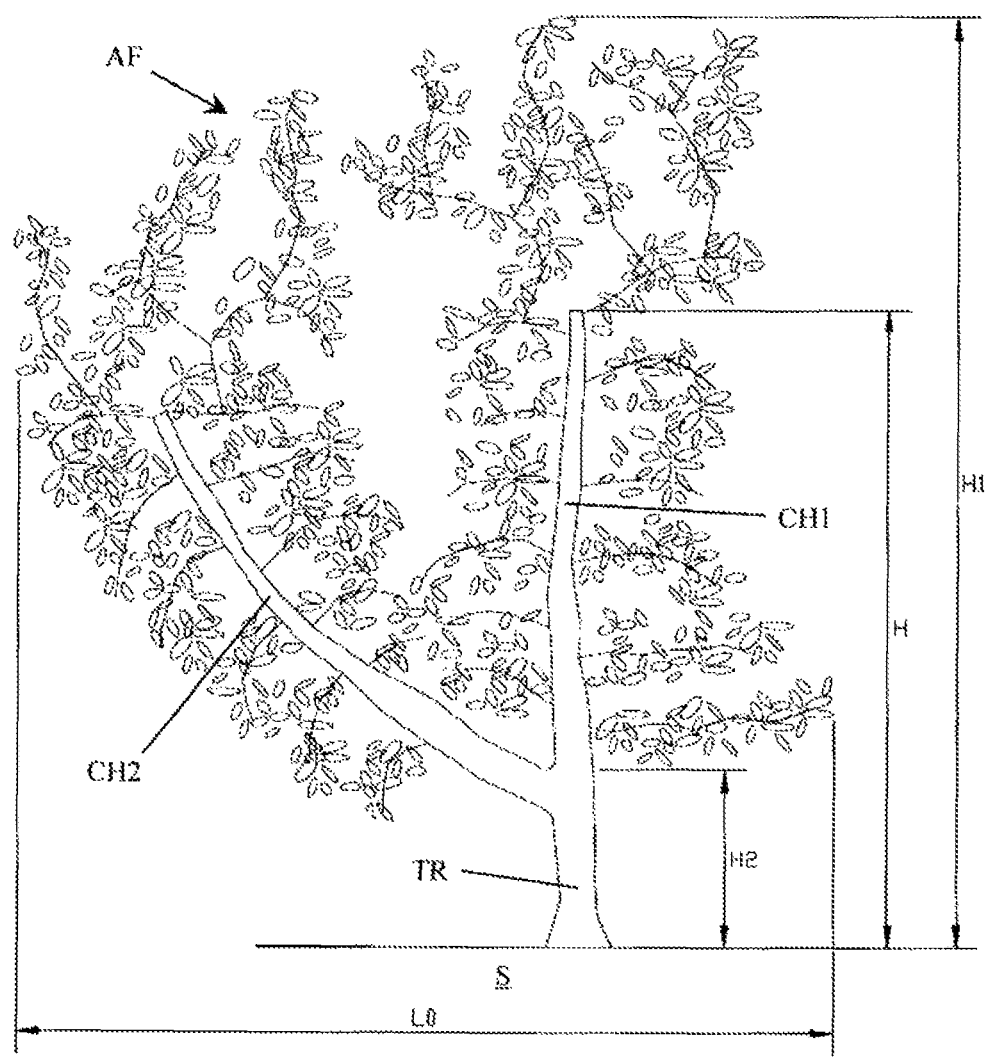
FIG. 4 is a front view of this olive tree.

According to another characteristic disposition of the invention, the two structural limbs that were kept of each tree comprise a first main limb CH1 rising vertically or in a direction close to vertical in the extension of the trunk TR of the tree and a second major limb CH2 oriented obliquely or in divergent manner relative to said first major limb by forming a V with the latter (FIG. 4).

Advantageously, the two main limbs CH1, CH2 are fastened to stakes T1, T2 so as to form between them an angle of between 30° and 90° and, preferably an angle of 45°.

According to another characteristic disposition, the first and second divergent main limbs CH1, CH2, or CH1' and CH2' of the trees forming a row R1, R2, R3, are placed successively in identical manner from one end of the row to the other.

According to an interesting implementation, the divergent first and second structural limbs CH1, CH2 of the trees forming a row R2 have an orientation that is the opposite of the first and second structure tree limbs CH1'CH2' of the adjacent or nearby (row(s) R1, R3 (FIG. 1).

During the harvesting operations, the machine is meant to move from the beginning of a row to the end of the row, it then moves along the adjacent row, in the opposite direction. It is necessary that it is always the vertical limb which is the first to enter the harvesting machine. The afore-mentioned characteristic arrangement makes it possible to meet this imperative.

According to another characteristic disposition, for the constitution of the second major limb CH2, one keeps a limb beginning at the trunk and at a distance from the ground S and more precisely, at a level higher than where the receiving floor of the straddling harvesting machines is generally located.

Figure 3:
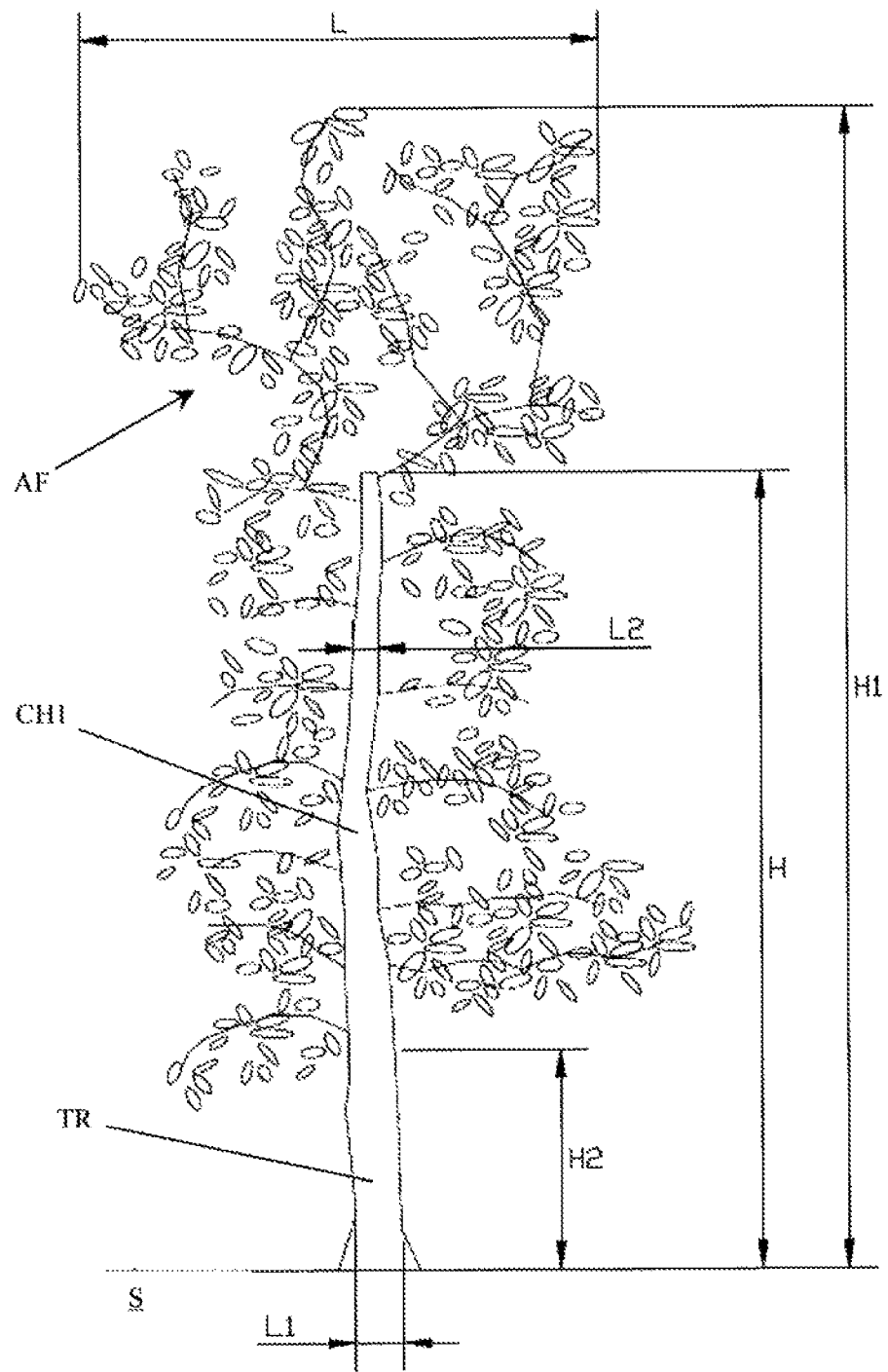
FIG. 3 is a side view of an olive tree obtained by implementing the method of the invention.

As shown in FIG. 3, the shape of the trees is executed in such a manner that their foliage presents a flattened shape forming a cushion of plant material, the width L of this soft cushion being in the range of 2 m, so as to permit its passage in the straddling harvesting heads of the harvesting machines.

In this figure, the reference L1 designates the average diameter of the tree trunks which may be in the range of 0.30 m. Reference L2 designates the average diameter of the vertical limb which can be in the range of 0.20 m. Reference H designates the maximum height of rigid wood of the trees which may be in the range of 3 m. Reference H1 designates the total height of the trees, the upper part of which consists of flexible wood, this height being potentially in the range of 5 m. Reference H2 designates the height of the trunk which may be in the range of 0.8 m as well as the point where the limbs CH1, CH2 begin.

According to another characteristic disposition, an annual or bi-annual pruning of the trees is performed so that the tree limbs CH1, CH2 that were kept remain within the espalier plane, and so that the cushion of plant material consisting of the rows of trees does not exceed a width of 2 m.

The advantages provided by the method of managing plantings according to the invention are in particular a much faster harvest with a continuously working machine, the plantings and the trees being adapted to such machinery, yields equal to those of super-intensive plantings and which are sustainable for several decades, planting and pruning costs being reduced, between 2 and 4 times less expensive than a super-intensive planting, an oil quality that will improve as the trees age, the compliance with planting criteria for species recognized for the production of oil with the controlled designation of origin, an adaptation to all the varieties of olives worldwide.

The method of planting management according to the invention is perfectly adapted to the harvesting of olives by means of harvesting machines derived from grape picking machines, in particular machines (see for example FR-2.939.273 and FR-2.939.274) of the type featuring, on the one hand a harvesting head comprising a shaking system constituted by two fruit-detaching assemblies mounted opposite each other and separated by a vertical space or passage way and, on the other hand, a system for receiving and conveying the fruit detached from the trees comprising a collecting plane or articulated, traversable floor consisting of inclined and pivoting plates or scales and two drive devices for the raw, collected crop dumped on the articulated floor, the drives being placed on both sides of the latter, towards a conveyor system transporting the crop to a storage bin.

The invention claimed is:

1. A method of processing olive tree plantings so as to permit harvesting with a straddling harvesting machine, the method comprising:
    planting parallel rows of young olive trees so that there is a spacing between trunks of the olive trees and a distance between the rows of the parallel rows;
    installing a collective vertical espalier on each row of the parallel rows, the collective vertical espalier comprising posts connected to wires, the wires extending parallel to the rows;
    installing divergent stakes for each olive tree on said collective vertical espalier, the divergent stakes for each olive tree forming a V-shape;
    attaching only one pair of divergent major limbs of each olive tree to a pair of the divergent stakes such that one major limb of the pair of divergent major limbs is attached to one divergent stake of the pair of divergent stakes and the other major limb of the pair of divergent major limbs is attached to the other divergent stake of the pair of divergent stakes, the major limbs of said only one pair of divergent major limbs each having a section respectively colinear to a corresponding stake of the divergent stakes, the pair of divergent major limbs and the pair of divergent stakes and the wires of the corresponding espalier being positioned in a single vertical plane and in a vertical plane of the row to which the olive tree belongs;
    removing any major limbs other than the pair of divergent major limbs of each olive tree if there are other major limbs;
    adapting an overhead fruit-bearing portion of the tree into a flattened configuration oriented in alignment with the row;
    maintaining the flattened configuration by periodic pruning until the young olive tree reaches maturity;
    harvesting the olives; and
    removing the divergent stakes and the collective vertical espalier after the young olive trees have reached maturity.

2. The method of claim 1, said pair of divergent major limbs comprising a first limb extending generally vertically in extension from the trunk of the tree and a second major limb oriented obliquely relative to said first major limb by forming a V-shape with said first major limb.

3. The method of claim 1, said pair of divergent major limbs being attached to the stakes so as to form an angle therebetween of between 30° and 90°.

4. The method of claim 1, further comprising:
    successively placing the pair of divergent major limbs of the olive trees in one row of the parallel rows in an identical manner from one end of the row to another end of the row.

5. The method of claim 4, further comprising:
    orienting the pair of divergent major limbs in the one row in a direction opposite to an orientation of the pair of divergent major limbs in an adjacent row.

6. The method of claim 1, the step of maintaining comprising:
    pruning of the olive trees on an annual or bi-annual basis so as to that branches of the olive trees remain in the espalier plane and that plant material of the rows of olive trees has a width of less than two meters.

7. The method of claim 1, wherein the spacing between the trunks of the olive trees is between three meters and eight meters.

8. The method of claim 1, the step of planting comprising:
    planting the young olive trees in pairs having a first spacing between two olive trees of one of the pairs of between 1.5 meters and three meters and a second spacing between two tree pairs of between three meters and seven meters.

9. The method of claim 1, the distance between the rows being between five meters and eight meters.

* * * * *